United States Patent [19]

Hannula

[11] 4,396,176
[45] Aug. 2, 1983

[54] VANDALPROOF TELEPHONE BOOTH CONSTRUCTION

[75] Inventor: Leslie A. Hannula, Waukegan, Ill.

[73] Assignee: Acoustics Development Corporation, Northbrook, Ill.

[21] Appl. No.: 233,917

[22] Filed: Feb. 12, 1981

[51] Int. Cl.³ .............................................. F16M 13/00
[52] U.S. Cl. ..................... 248/551; 179/184
[58] Field of Search ............... 248/551, 125, 27.1; 52/36, 27; 179/183, 146 R, 189 R, 179, 184, 63 R

[56] References Cited

U.S. PATENT DOCUMENTS

| | | | |
|---|---|---|---|
| 3,471,656 | 10/1969 | Quigley | 179/146 R |
| 3,511,941 | 5/1970 | Quigley | 52/36 X |
| 3,846,594 | 11/1974 | Morrell et al. | 179/179 |
| 3,868,483 | 2/1975 | Trimmer et al. | 179/146 R |
| 4,152,874 | 5/1979 | Ertl | 179/183 X |
| 4,160,136 | 7/1979 | McGough | 179/184 |

Primary Examiner—William H. Schultz
Assistant Examiner—Ramón O. Ramirez
Attorney, Agent, or Firm—Kinzer, Plyer, Dorn & McEachran

[57] ABSTRACT

A security mounting for a coin telephone includes a mounting member having a plurality of mounting openings and a frame positioned about the area of the mounting member having the openings. A telephone enclosure is positioned within the frame and has security studs which interlock with the mounting openings. The telephone enclosure is smaller in one dimension than the opening formed by the frame, thus permitting the enclosure to be installed and the security studs interlocked with the mounting openings. A locking bar is positioned within the frame and fills the space formed by the difference in dimension between the frame and telephone enclosure. A telephone mounting cover encloses the frame and locking bar and has an opening extending peripherally about the telephone enclosure.

5 Claims, 6 Drawing Figures

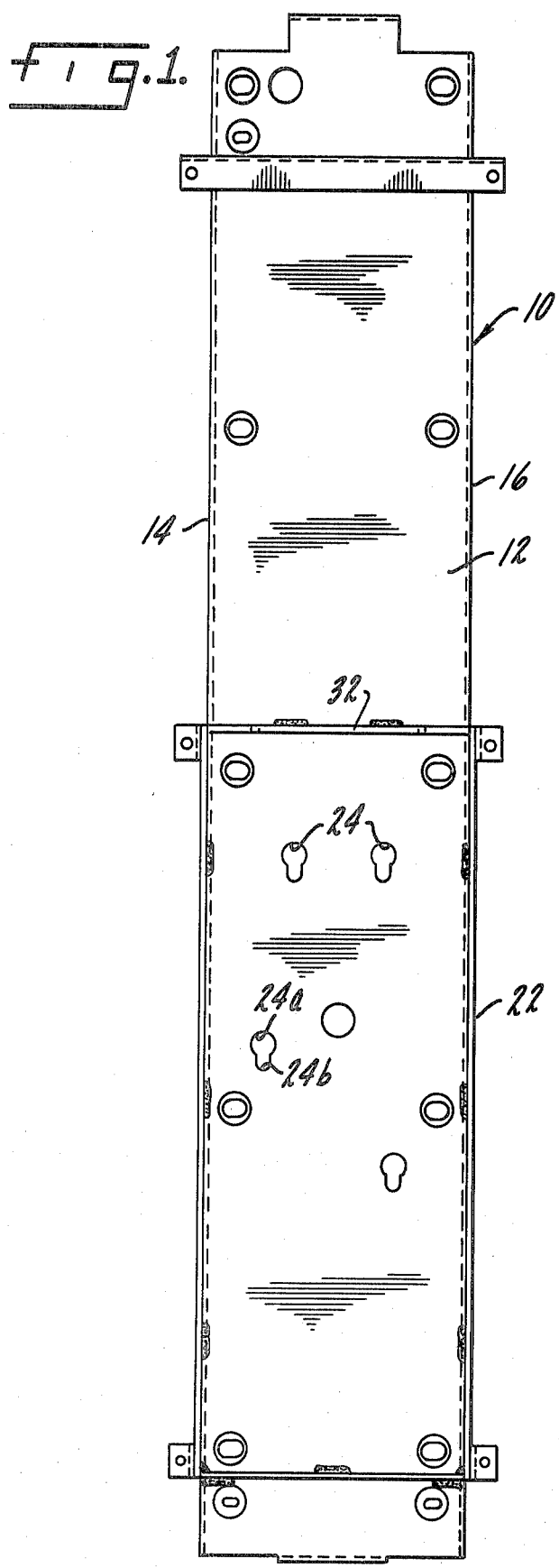
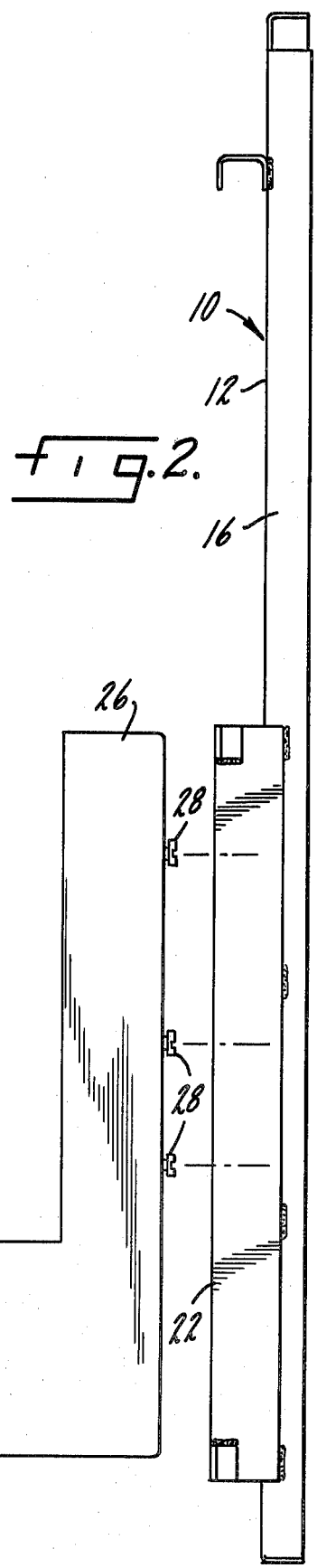

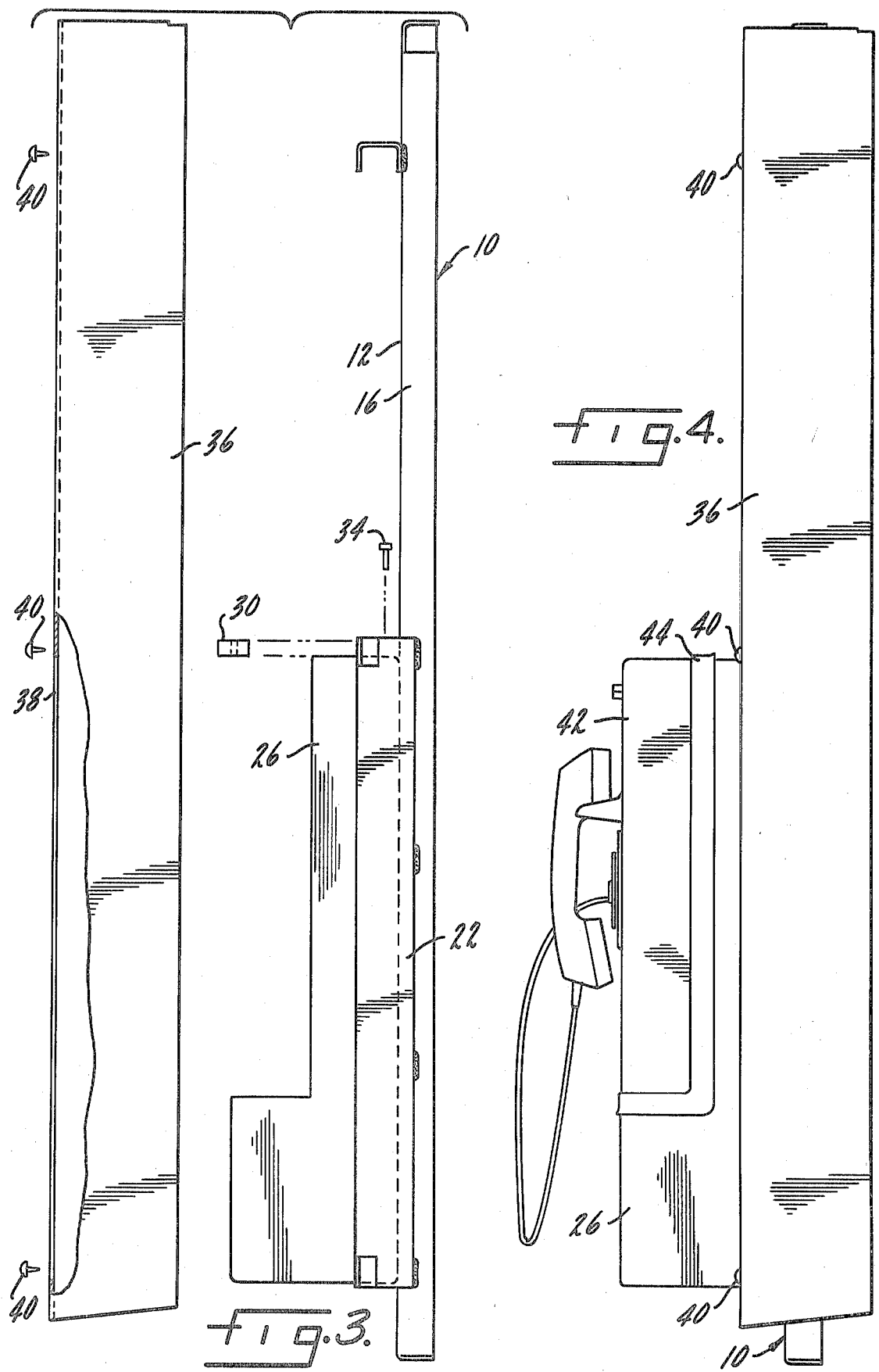

VANDALPROOF TELEPHONE BOOTH CONSTRUCTION

SUMMARY OF THE INVENTION

The present invention relates to a security mounting for coin telephones and in particular to a mounting arrangement in which the various subcomponents of the assembly are formed adapted and interlocked in such a way as to make the mounting extremely vandalproof.

A primary purpose of the invention is a security mounting for coinbox telephones or the like which may be utilized with various types of telephone booths such as posts, enclosures and the like.

Another purpose is a telephone mounting arrangement providing a high degree of security, which prevents unauthorized removal of the coinbox without otherwise destroying the entire telephone structure.

Another purpose is a security mounting of the type described which prevents quick removal of the telephone coinbox except in an authorized manner.

Other purposes will appear in the ensuing specification, drawings and claims.

BRIEF DESCRIPTION OF THE DRAWINGS

The invention is illustrated diagrammatically in the following drawings wherein:

FIG. 1 is a plan view of a telephone mounting channel showing the mounting frame positioned thereon, FIG. 2 is a side view of the channel and frame of FIG. 1 with the telephone enclosure positioned for attachment, FIG. 3 is a side view, similar to FIG. 2, showing the telephone mounting cover positioned for attachment, FIG. 4 is a side view of the assembled telephone mounting.

DESCRIPTION OF THE PREFERRED EMBODIMENT

The present invention relates to a security mounting for coin telephones. In prior assemblies it has been possible, by the use of a crowbar or similar instrument, to quickly remove the coinbox. Such security mountings may use telephone mounting screws and security studs of the type shown in prior U.S. Pat. No. 4,152,874, which studs are received in keyhole-shaped mounting holes. The head of the stud and the keyhole shape of the mounting hole provide an interlock. However, there have been some instances in which that interlock was not sufficient protection to prevent removal of the coinbox. The construction of the present application utilizes such security studs and keyhole-shaped openings in the mounting member. However, there are additional protective features which will make it extremely difficult, if not impossible, for the use of a crowbar or similar instrument to quickly remove the telephone coinbox. There is no security mounting arrangement which can prevent removal of the telephone coinbox if the vandal or thief has sufficient time. However, normally time is precious in such an operation and thus what is essential is to provide a security construction which will prevent rapid removal of the coinbox.

Figure 6:
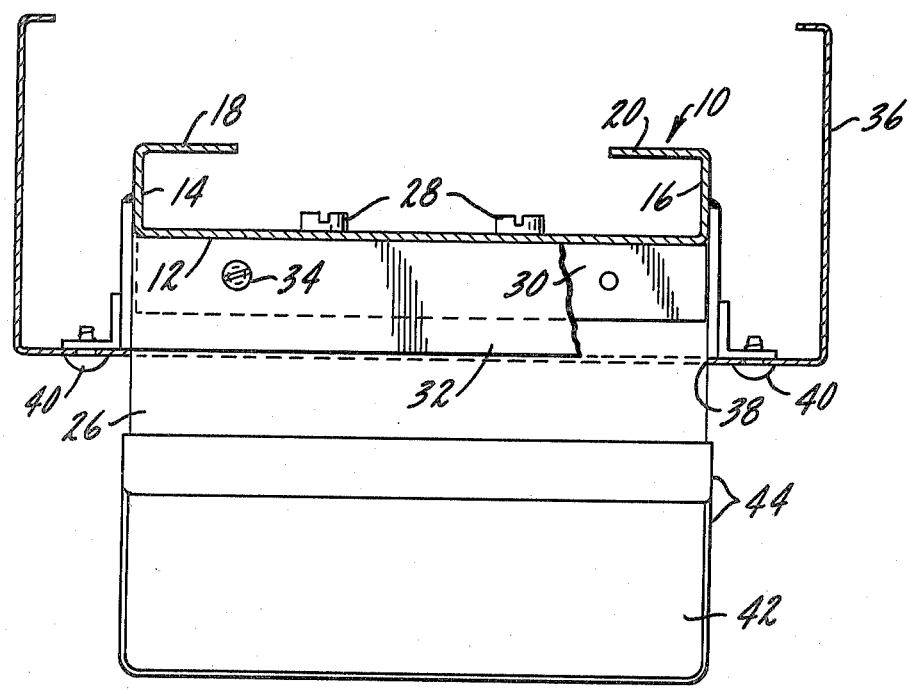
FIG. 6 is a section along plane 6—6 of FIG. 5.

A mounting member or mounting channel is illustrated at 10 in FIG. 1 and, as shown in the section of FIG. 6, will have a front wall 12, side walls 14 and 16, and inturned flanges 18 and 20, the combination of such walls together forming a channel. A frame 22, rectangular in shape, may be welded or otherwise secured to the face 12 of the channel in an area in which there are formed a plurality of mounting openings 24. As indicated above, and as described in more detail in the above-referenced patent, such openings have a keyhole shape with a larger opening portion 24a and a somewhat smaller portion 24b. The number and placement of such openings will vary depending upon the particular coinbox telephone.

A telephone enclosure indicated at 26 and shown particularly in FIG. 2 will include the conventional coinbox. There are a plurality of security studs 28 extending outwardly from the rear of enclosure 26, which studs will interlock with openings 24 to mount the enclosure within frame 22. First, the enlarged heads of studs 28 are positioned to pass through the larger portions 24a of the keyhole-shaped openings. The telephone enclosure 26 is then permitted to drop down to a level wherein the heads of studs 28 are positioned behind the smaller portions 24b of the mounting openings. In this connection, it should be noted that the height of enclosure 26 is less than the height of the space formed or defined by frame 22. As shown in FIG. 2, the enclosure is located near the top of the frame opening when it is first positioned within the frame so that the studs may pass through the larger part of mounting openings 24. The enclosure is then dropped down whereby the studs are positioned to interlock with the mounting opening.

What is important is that the difference in dimension between the frame and enclosure permit movement of the enclosure in only one direction. This may dictate either a vertical or horizontal difference in dimension.

In assembly the channel will first have frame 22 welded thereto. When the security mounting arrangement is assembled in the field, which will customarily be the case, channel 10 may well be attached to a mounting post or some other supportive device which is used in forming the telephone enclosure or the like. After the enclosure is positioned in the frame as described, a locking bar 30 is positioned within the space defined between top wall 32 of the frame and the top of enclosure 26 after which screws or the like 34 are fastened down through frame top 32 and then through the bar. Once the locking bar is so positioned it is impossible to move enclosure 26 in an upward direction whereby the enlarged heads of studs 28 would be positioned behind the enlarged portions 24a of openings 24. Thus, at this point the telephone enclosure is firmly positioned within the frame and cannot be removed unless locking bar 30 is first removed.

After the locking bar has been so positioned, a telephone cover 36, illustrated in FIG. 3, is then positioned over the above-described assembly with a portion of the telephone enclosure 26 extending through an opening 38 in cover 36. The cover will be attached by screws or the like 40. The cover will mask locking bar 30 and that portion of the channel above it, thereby preventing removal of screws 34 which hold the locking bar in position.

Figure 5:
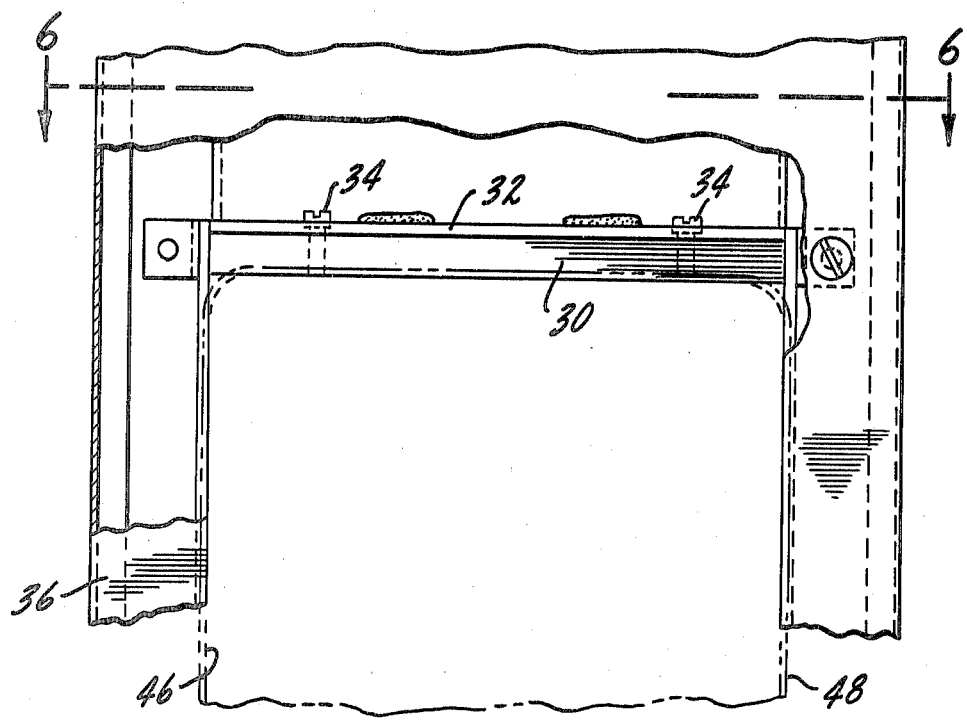
FIG. 5 is a partial enlarged front view illustrating the position of the locking bar.

After cover 36 has been suitably attached to the channel, frame and enclosure as described, the telephone housing itself, which will include the handset, is then installed in the opening provided in telephone enclosure 26. This construction is illustrated in FIG. 4. It should be noted that there is an outwardly-extending peripheral lip 44 on telephone housing 42 which outwardly extending lip extends beyond the periphery of opening 38 in cover 36. Thus, the cover cannot be removed because of the telephone housing. This relationship is particularly illustrated in FIG. 5 wherein the periphery of opening 38 is illustrated at line 46 and the periphery of lip 44 is illustrated by line 48.

Of particular importance in the invention is the manner of assembly in which each component of the overall construction, when added, prevents removal of previously-assembled portions of the structure. For example, locking bar 30 prevents removal of telephone enclosure 26, once it has been positioned in the manner described. After the locking bar has been so positioned, cover 36 is added and the addition of this element prevents removal of the locking bar. After the cover has been so positioned, the telephone housing is added and the lip of the housing prevents removal of the cover.

Of importance is the fact that the coinbox cannot be removed unless the above-described assembly process is reversed. A crowbar cannot be inserted underneath the coinbox of telephone enclosure 26 and thereafter be used to remove the enclosure as the locking bar will prevent the enclosure from being moved upwardly in its mounting on channel 10. Not only is the locking bar, when positioned, effective to prevent removal of the telephone enclosure, but the screws holding the locking bar are inserted from above, completely masked by the cover. This provides enhanced security as the screws are essentially unreachable by any act of vandalism short of complete removal of the entire telephone assembly.

Channel 10 may be a part of a telephone post assembly, which is conventionally used in the outdoor mounting of coin telephones. The invention should not be limited to such a construction as the channel or a similar mounting member may be used in an almost endless variety of coin telephone mountings.

Although not specifically shown herein, telephone mounting screws of the type shown in U.S. Pat. No. 4,152,874, in addition to the security studs shown therein, may also be used in the present construction to provide added security. Additionally, again to provide added security, the mounting screws 34 for locking bar 30 and mounting screws 40 for cover 36 may be of special construction whereby they may only be inserted or removed by a special wrench or other mounting device normally only available to telephone company personnel.

Whereas the preferred form of the invention has been shown and described herein, it should be realized that there may be many modifications, substitutions and alterations thereto.

The embodiments of the invention in which an exclusive property or privilege is claimed are defined as follows:

1. A security mounting for a coin telephone including a mounting member having a plurality of mounting openings, a frame positioned about the area of the mounting member having said mounting openings, a telephone enclosure positioned within said frame and having securing means extending outwardly therefrom and through said mounting openings, said telephone enclosure being smaller in one dimension than said frame, a locking bar positioned within said frame and filling the space formed by the difference in dimension between said frame and enclosure, and a telephone mounting cover enclosing said frame and locking bar and having an opening extending peripherally about said telephone enclosure.

2. The security mounting of claim 1 further characterized in that said mounting member openings and the securing means extending outwardly from said telephone enclosure form an interlock preventing removal of said telephone enclosure unless said enclosure can be moved in the direction, within said frame, of the dimension difference.

3. The security mounting of claim 2 further characterized in that said mounting openings have a keyhole configuration with said securing means having a head thereon of a size and shape to fit through the larger portion of said keyhole-shaped openings, but not through the smaller portion.

4. The security mounting of claim 1 further characterized in that said mounting openings and securing means form an interlock between the mounting member and enclosure, wherein the enclosure can only be mounted to the mounting member by utilizing the difference in dimension between said frame and the enclosure.

5. The security mounting of claim 1 further characterized by and including a telephone housing mounted to said telephone enclosure, said telephone housing having an outwardly-extending peripheral lip preventing removal of said telephone cover.

* * * * *